United States Patent

Fagan et al.

[15] 3,646,526

[45] Feb. 29, 1972

[54] FIFO SHIFT REGISTER MEMORY WITH MARKER AND DATA BIT STORAGE

[72] Inventors: Lloyd D. Fagan, Santa Clara, Calif.; David R. Hadden, Jr., Eatontown; David Haratz, New Shrewsbury; Lorenz M. Sarlo, Matawan, all of N.J.

[73] Assignee: The United States of America as represented by the Secretary of the Army

[22] Filed: Mar. 17, 1970

[21] Appl. No.: 20,183

[52] U.S. Cl. ..........................340/173 R, 307/208, 307/221, 307/238, 307/246, 328/37, 340/172.5, 340/173 CA, 340/173 RC

[51] Int. Cl. ................G11c 19/00, G11c 11/24, H03k 25/02

[58] Field of Search .........................307/221, 208, 238, 246; 328/37; 340/173 RC, 173 FF, 172.5, 173 R, 173 CA

[56] References Cited

UNITED STATES PATENTS 3,510,680 5/1970 Cogar ....................................307/221
3,297,950 1/1967 Lee ..................................340/173 FF
2,933,622 4/1960 Clark.....................................307/221

OTHER PUBLICATIONS

Terman, Three- Phase Shift Register, IBM Technical Disclosure Bul., Vol. 12 No. 3, Aug. 1969, pp. 442- 444

Boysel, Multiphase Clocking Achieves 100-Hsec Mos Memory, Electronic Design News, June 10, 1968, pp. 50- 52, 54, 55

*Primary Examiner*—Bernard Konick
*Assistant Examiner*—Stuart Hecker
*Attorney*—Harry M. Saragovitz, Edward J. Kelly, Herbert Berl and Jeremiah G. Murray

[57] ABSTRACT

A first-in, first-out (FIFO) memory having a plurality of memory cells, each for storing one data bit and one marker bit. The marker bit is provided for steering the data bits into successive memory cells when writing. Reading data is accomplished by shifting the data in succession out one end of the FIFO. Each memory cell consists only of MOS-transistors, which are connected so as to function as sample-and-hold devices and clocked inverter devices. One sample-and-hold transistor and one inverter each connected to the same clock will store a bit, either data or marker. Sample-and-hold transistors and inverters are coupled between the bit storage sections of common and adjacent memory cells so as to provide the proper logic for steering the data bits for shifting to adjacent cells the data and marker bits.

The invention described herein may be manufactured, used, and licensed by or for the Government for governmental purposes without the payment to us of any royalty thereon.

7 Claims, 4 Drawing Figures

INVENTORS,
LLOYD D. FAGAN, DAVID R. HADDEN, Jr.,
DAVID HARATZ & LORENZ M. SARLO
BY [signature] AGENT
ATTORNEYS INVENTORS,
LLOYD D. FAGAN, DAVID R. HADDEN, Jr.
DAVID HARATZ & LORENZ M. SARLO
BY: Jeremiah G. Murray AGENT
Harry M. Saragovitz,
Edward J. Kelly & Herbert Berl
ATTORNEYS.

FIFO SHIFT REGISTER MEMORY WITH MARKER AND DATA BIT STORAGE

The invention described herein may be manufactured, used, and licensed by or for the Government for governmental purposes without the payment to us of any royalty thereon.

The present invention relates to electronic memory devices and more particularly to a first-in-first-out (FIFO) memory.

In the field of automatic data processing, the FIFO has found widespread use as a buffer memory. Those concerned with the development of computers have recently recognized the distinct advantages inherent in the use of metal oxide semiconductor (MOS) transistors as gain elements. Of course, the basic advantage of MOS-transistors is the ability to economically manufacture such transistors in high-quality integrated circuits. One of the most critical problems confronting designers of integrated circuits is the minimizing of the numbers and kinds of elements of which the integrated circuit is formed.

The general purpose of the present invention is to provide a FIFO memory which uses only one type of element, the MOS-transistor, and which uses a less number of transistors then prior art devices which perform the same FIFO function.

Other objects and many of the attendant advantages of this invention will be readily appreciated as the same becomes better understood by reference to the following detailed description when considered in connection with the accompanying drawings wherein.

Figure 1:
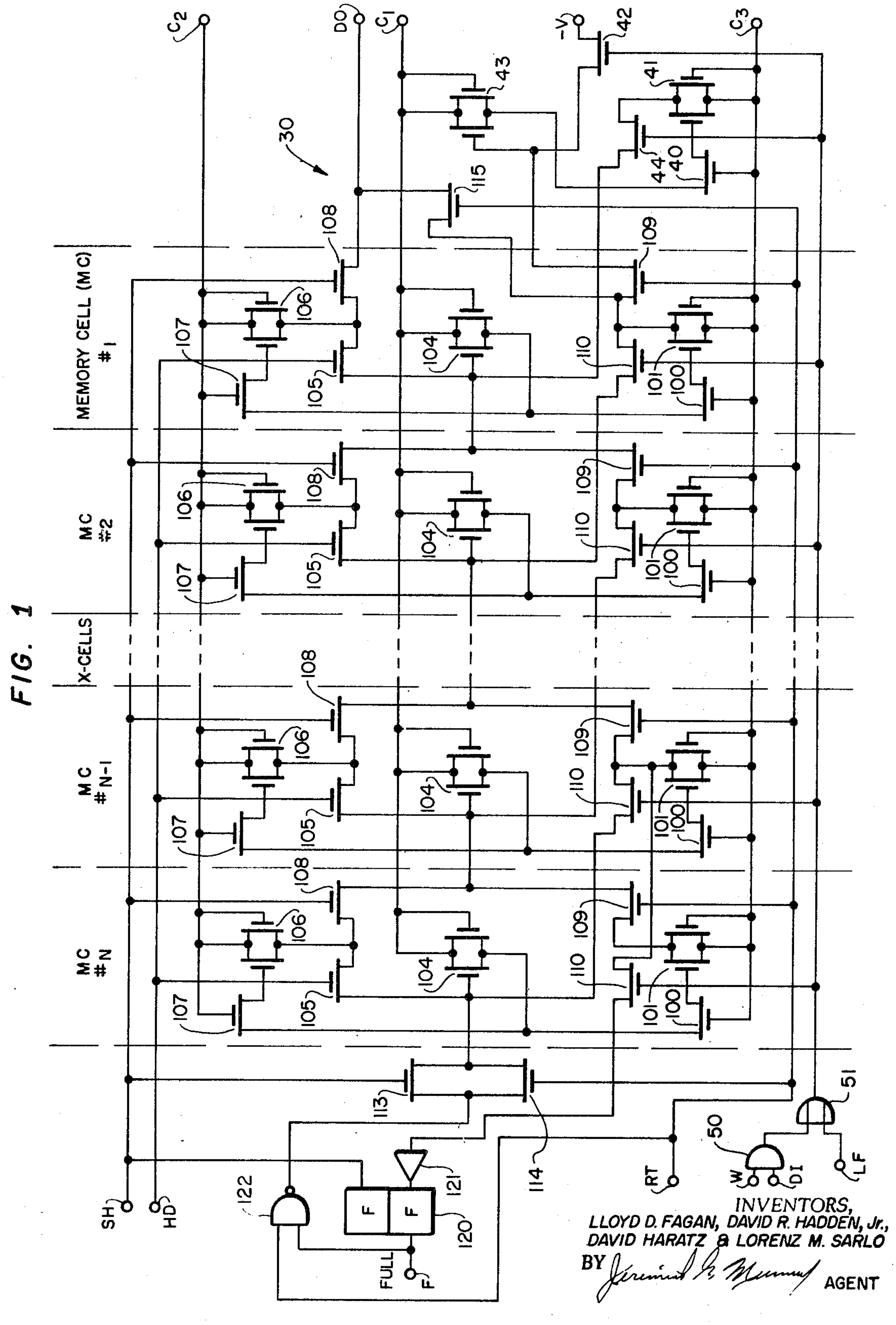
FIG. 1 shows a schematic diagram of a preferred embodiment of the invention.

Referring now to the drawings there is shown in FIG. 1 a FIFO memory having "N" memory cells. Each of the memory cells contains 12 MOS-transistors capable of storing both an information bit and a marker bit. With a plurality of the memory cells connected as shown it is possible to:

1. Write information into each of the cells in succession as determined by the location of the marker bit, 2. Read the information bit in the first memory cell and shift all the other information bits one cell to the right, 3. Shift the marker bit one cell to the right upon reading an information bit and to the left upon the writing of an information bit.

More specifically, the lower portion of each of the memory cells contains the marker bit, which is used as a marker to steer the incoming information into the first empty memory cell, i.e., the memory cell closest to the right which has no information stored therein. The marker bit is shifted one memory cell to the left each time an information bit is stored. When writing, the information bits are steered in succession into the first empty cell closest to the right side of the FIFO.

Information is read out of the FIFO from the right side by merely shifting the information contained in memory cell No. 1 out of the FIFO and then shifting all of the remaining information bits one cell to the right. The marker bit is also shifted one cell to the right so that the next information bit to be stored will be steered to the proper cell.

Figure 2:
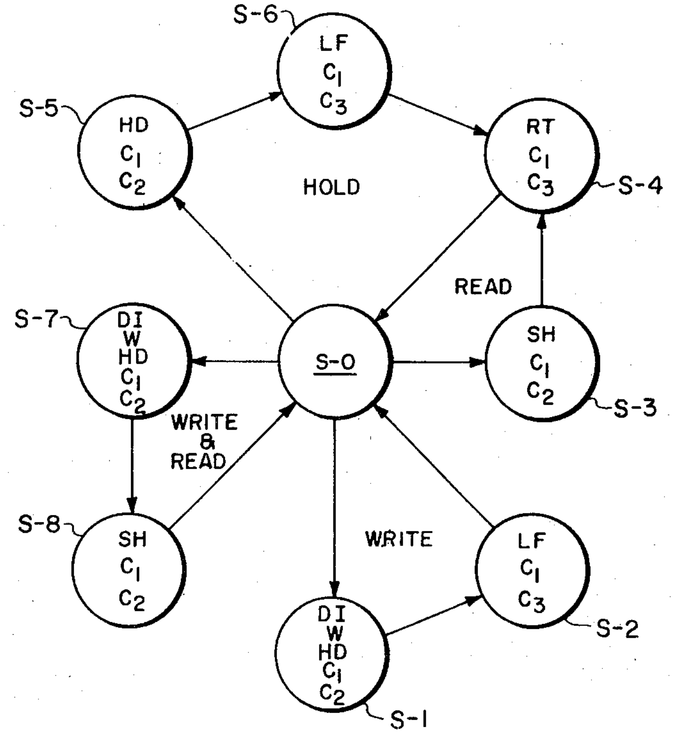
FIG. 2 shows a state graph of a finite state machine which controls the device of FIG. 1.

A more specific description of the structure and operation of the FIFO will be described with the aid of the state graph of FIG. 2, which shows the various states assumed and inputs provided by a typical finite state machine (not shown). These FIFO inputs will provide the various control and data signals to the FIFO memory. Each of the circles in FIG. 2 represents one of nine states of the finite state machine. Such machines may be implemented with oscillators, logic circuits, and drivers, for providing the indicated input signals to the FIFO memory. The finite state machine normally assumes the state marked "S-O" which puts a logical zero or ground voltage on all of the inputs listed in FIG. 2.

Figure 3:
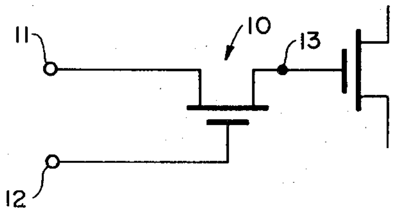
FIGS. 3 and 4 show schematic diagrams of a portion of the device shown in FIG. 1.

Shown in FIG. 3 is an MOS transistor 10, having a gate terminal 12, a source terminal 11, and a drain terminal 13, connected to the gate terminal of a second MOS-transistor. This configuration will function as a binary sample-and-hold means. For purposes of this description the zero voltage is defined as a binary "0" and a negative voltage "−V" is a binary "1." When the gate terminal 12 goes negative the transistor 10 turns "on" and the drain terminal 13 assumes the voltage on source terminal 11. When the negative voltage on gate terminal 12 is removed, the transistor 10 turns "off" and the voltage on drain terminal 13 will remain there for a finite time in the form of a charge on the stray capacitance of the connection between the drain terminal 13 and the next transistor. Therefore, terminal 13 will assume a "0" or a "1," for a finite time if terminal 11 was a "0" or a "1," respectively and terminal 12 was impulsed by a negative voltage or a "1."

Figure 4:
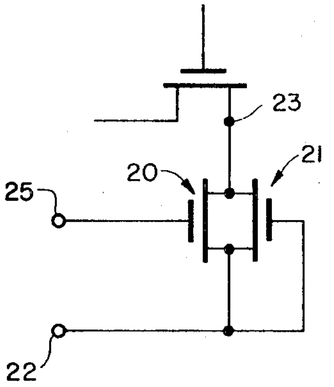

FIG. 4 shows a pair of MOS-transistors 20 and 21 having their source terminals and the gate terminal of transistor 21 connected in common to terminal 22. The drain terminals of transistors 20 and 21 are connected in common to terminal 23 which in turn is connected to the source terminal of a third MOS-transistor. This configuration will function as a clocked binary inverter. When the voltage on terminal 22 goes negative and the voltage on terminal 25 is zero, transistor 21 will be turned "on" and the negative voltage on terminal 22 will be transferred through transistor 21 to terminal 23. Terminal 23 will maintain the negative voltage in the form of a capacitive charge when the negative voltage on terminal 22 is removed. If, however, the voltage on terminal 25 was negative, transistor 20 will be turned "on" and the zero voltage on terminal 22 will be transferred to terminal 23 or, in other words, the charge will be removed. Therefore, the voltage on terminal 23 will be the inverse of the voltage on terminal 25 after each time a clock signal on terminal 22 goes momentarily negative. More specific descriptions of the physics of the MOS-transistor may be readily found in standard texts. The FIFO memory of FIG. 1, which will now be described in more detail, is made up of a plurality of interconnected sample-and-hold devices and clocked inverters of the type just described.

The FIFO inputs, as mentioned earlier, are controlled by a finite state machine (not shown) having the states shown in FIG. 2. Normally the finite state machine is in the state S-O. The states S-1 to S-8 are states which the machine will automatically assume depending on whether an operator or a computer system wishes to write, read, write and read, or hold the information contained in the FIFO. When in one of the particular states S-0 to S-8, the finite state machine will automatically apply voltages to those FIFO input terminals indicated in the particular circle which represents that state. The various FIFO input terminals have generally the following functions:

| FIFO input | function |
|---|---|
| DI | Data Input |
| W | Write |
| HD | Hold Data |
| SH | Shift Data Right |
| RT | Shift Marker Right |
| LF | Shift Marker Left |
| $C_1$ | Clock 1 |
| $C_2$ | Clock 2 |
| $C_3$ | Clock 3 |

A marker bit storage cell 30 is interconnected between memory cell No. 1 and some of the FIFO inputs. Cell 30 is provided primarily for the purpose of holding or storing the marker bit when the FIFO is empty. The state of cell 30, when the marker bit is stored therein, is such that there is a negative voltage on the drain terminal of transistor 40 which is indicative of a binary "1." Also, at this time there will be a binary "0" on the output terminal of inverter 41 i.e., the output of inverter 41 will be at ground or zero potential.

When the cell 30 contains a binary "1," as just explained, then all the memory cells No. 1 to No. N contain a binary "0" in both the marker bit and information bit sections. The marker bit section (lower section), is, therefore, in a state such that the drain terminals of all the transistors 100 are at ground or zero potential which is indicative of a binary "0." At this time the output of each of the inverters 101, in the memory cells No. 1 to No. N will be at a negative potential which indicates a binary "1." When the FIFO is empty, the information bit section (upper section) is in a state such that the drain terminal of the transistors 107 in each of the memory cells No. 1 to No. N is at ground potential or in other words contains a binary "0." Again it is pointed out that the output of the inverters 106 will be at the negative potential indicative of the binary "1."

To summarize briefly, the state of the empty FIFO is such that cell 30 contains a "1" in the form of a negative voltage on the output of the sample-and-hold transistor 40 and a "0" on the output of the clocked inverter 41, and each of the memory cells No. 1 to No. N contain a "0" in both the marker bit and information bit sections in the form of a ground potential on the outputs of the sample-and-hold transistors 100 and 107 respectively. Also, a binary "1" is present on the outputs of each of the inverters 101 and 106.

The structure of the FIFO and the operation thereof will now be simultaneously described by describing in detail the steps involved in the writing or storing of the binary word "1011."

When requested to store a bit of information in the FIFO, the finite state machine will leave state S-0 and automatically go to state S-1, provide the indicated inputs to the FIFO, proceed to state S-2, again provide the indicated inputs, and then return to the state S-0.

The first binary bit "1" of the binary word "1011" is stored in the FIFO by applying a "1" to the data input terminal DI. Also, a binary "1" or a negative voltage is applied to terminals W, HD, $C_1$, and $C_2$ as is indicated in FIG. 2. The negative voltage on terminal HD clocks each sample-and-hold transistor 105. Since the output of the inverters 106 are all "1," then the output of the transistor 105 will be a "1." Also, since the W and DI inputs are each "1," then the output of AND-gate 50 and OR-gate 51 will be a "1" and all of the sample-and-hold transistors 110 and 44 will also be clocked. When transistor 44 is turned on, by the coincidence of a "1" on data input terminal DI and write terminal W, the voltage on the drain terminal or output of the transistor 105 in memory cell No. 1 will be shunted to ground via transistor 44 and the output of inverter 41, which is at ground potential. Therefore, the output of transistor 105 in memory cell No. 1 will be changed from a "1" to a "0" when transistor 44 is clocked on. The output of the transistors 105 in the remaining memory cells No. 2 to No. N will not be altered when the transistors 110 are clocked on, because the voltage on the outputs of inverters 101 is negative at this time.

Terminal $C_1$ is also clocked at this time and the input voltages to inverters 104 are inverted and applied as input signals to the sample-and-hold transistors 107. Terminal $C_2$ is then clocked and the output or drain terminal of transistors 107 are made to assume their input voltages. The outputs of inverters 106 will assume the inverse of the transistor 107 outputs.

As just explained, the input to inverter 104 in memory cell No. 1 was forced to a zero. Therefore, the output of inverter 104 in memory cell No. 1 is a "1" and the output of transistor 107 will change to a "1" when clocked by terminal $C_2$ and the output of inverter 106 will change to "0." In the remaining memory cells No. 2 to No. N the input to inverter 104 was a "1." In these cells the outputs on transistors 107 will therefore not change.

It is again pointed out that the stored bits or the voltages on the MOS transistors are in the form of a capacitive charge which, if permitted to sit long enough, will eventually leak off. Therefore, provision is made to periodically recharge the memory cells. During the write operation, the information bits are recharged when they are shifted down to the center section i.e., when the hold terminal HD is pulsed. The marker bit is recharged when it is shifted from one cell to the next after the storage of the information bit.

For example, after writing or storing a "1" in memory cell No. 1, it is then necessary to shift the marker bit left from cell 30 to memory cell No. 1. This operation is performed when the finite state machine is in state S-2. Terminal LF is clocked and sample-and-hold transistors 44 and 110 are all turned on. The outputs of inverters 41 and 101 are applied to the inputs of the inverters 104 in the next succeeding memory cell. Inverters 104 are then clocked by terminal $C_1$ and the input is inverted and applied to the inputs of transistors 100. Then terminal $C_3$ is clocked and all of the transistors 100 will sample-and-hold the output of inverters 104. Inverters 101 will invert the sampled bits. Therefore, the "0" on the output of inverter 41 will be sampled by transistor 44, inverted to a "1" by inverter 104 in memory cell No. 1, sampled by transistor 100 and inverted to a "0" by inverter 101 in cell No. 1. The "1" on the output of transistor 40 has now been shifted to the output of transistor 100. It is pointed out that the −V voltage on the input to sample-and-hold transistor 42 is also inverted to a "0" by inverter 43, sampled-and-held by transistor 40, and inverted to a "1" by inverter 41. The marker bit has now been shifted to memory cell No. 1.

The second bit "0" in the binary word "1011" is now stored or written in memory cell No. 2. As before, the finite state machine will leave state S-0, go to state S-1, and put a binary "0" or a ground potential on the data input terminal DI. The output of AND-gate 50 will be a "0" since data input terminal DI is a "0" and, therefore, none of the sample-and-hold transistors 100 and 40 will be clocked on. Therefore, when the information bits are shifted from the upper section to the middle section, by the application of a negative pulse on hold terminal HD, the output of sample-and-hold transistors 105 will not be altered. More specifically, the charge on the outputs of inverters 106 will not be shunted to ground via the transistors 110 or 44 since these transistors have not been turned on. As before, the outputs of transistors 105 will be inverted by inverters 104 when terminal $C_1$ is clocked. Then terminal $C_2$ is clocked and the sample-and-hold transistors 107 will then invert the outputs of transistors 107.

To briefly summarize, when a "0" is to be stored the information bits are shifted down to the inverters 104 and shifted back to the transistors 107 and inverters 106 without any change in the information. However, as explained above, the capacitive charges on the various elements 107 and 106 will have been recharged up to maximum.

At this point, the finite state machine will leave state S-1 and go to S-2. In the S-2 state, the marker bit, which is now in the lower section of memory storage cell No. 1, will be shifted to memory storage cell No. 2 via the sample-and-hold transistor 110 in memory cell No. 1, the inverter 104, sample-and-hold transistor 100, and inverter 101 of memory cell No. 2.

The third and fourth binary bits in the binary word "1011" will then be stored in succession in memory cell No. N-1 and No. N following the same procedure as just described.

When the FIFO is full, a signal derived from the output of inverter 101 in memory cell No. N-1 is used to set flip-flop 120 via sample-and-hold transistor 110 and inverter 121 in memory cell No. N. Only when the marker bit is in memory cell No. N-1, will there be a "0" on the output of the inverter 101 therein. When the last information bit is to be stored, the marker bit in memory cell No. N-1 will first steer the information bit into the memory cell No. N. After steering the last information bit, the marker bit will be shifted from memory cell No. N-1 to memory cell No. N. In the process of shifting the marker bit terminal LF is pulsed, thereby clocking sample-and-hold transistor 110 in memory cell No. N and causing the drain terminal thereof or the input to inverter 121 to go to ground. The output of the inverter 121 sets flip-flop 120, thereby putting a "1" on output terminal F. This output F may be used to control the finite state machine and thereby indicate when the FIFO is full.

Retrieving a bit of information from the FIFO, or in other words, the reading function is performed when the finite state machine goes from state S-0 to S-3 to S-4 and back to S-0. When in state S-3, all the data bits in the FIFO are simply shifted one cell to the right and a "0" is written in memory cell No. N. The information bit, which was shifted out of memory cell No. 1, is detected on the data output terminal DO. The reading operation or the shifting of the information bits to the right is initiated, as shown in FIG. 2, by first pulsing terminal SH which in turn pulses or turns on all sample-and-hold transistors 108. Therefore, the input to inverters 104 in each of the memory cells No. 1 to No. N-1 will be equal to the voltage stored on the output terminal of the inverters 106 of the succeeding memory cell. The pulse on terminal SH also resets flip-flop 120 thereby indicating that the FIFO is no longer full. The input to inverter 104 in memory cell No. N. when terminal SH is pulsed, is derived from the output of NAND-gate 122 via sample-and-hold transistor 113. Since the RT and F inputs to NAND-gate 122 are "0" then, the output is a "1." Terminal $C_1$, is also pulsed at this time, thereby clocking inverters 104. As before, the outputs of inverters 104 are then stored in the information bit section of each of the memory cells No. 1 to No. N when the terminal $C_2$ is clocked. The reading function is now complete and the remainder of the cycle, i.e., shift the marker bit to the right, will now be performed.

The finite state machine enters state S-4, thereby clocking terminal RT which turns on the sample-and-hold transistors 109 in each of the memory cells No. 1 to No. N. Sample-and-hold transistors 109 samples the outputs of the inverters 101 and applies them as inputs to inverters 104 in the preceding memory cell. The inverters 104 are clocked by input clock $C_1$ and the outputs thereof are stored in the lower section of each memory cell by a clock pulse on input clock $C_3$.

It is pointed out that sample-and-hold transistor 114 is also turned on when terminal RT is pulsed thereby applying the output of NAND-gate 122 to inverter 104 in memory cell No. N. Upon clocking input terminal $C_3$, a "0" will then be stored in the lower section of memory cell No. N, since the output of NAND-gate 122 is a "1."

Sample-and-hold transistor 115 will also be turned on when terminal RT is pulsed. If the marker bit was contained in memory cell No. 1 when RT is pulsed, then output terminal DO will go to ground potential thereby signalling that the FIFO is empty. The grounding of the DO terminal at this time may now be used to prevent any further reading of the FIFO.

It has been pointed out several times above that the information and marker bits are contained in the FIFO in the form of a capacitive charge on the MOS-devices. It was also pointed out that a recharging of all MOS-devices would take place during each read and write cycle. If however, after a predetermined time there should be no request to either read or write information, then in order to prevent a loss of information, the finite state machine will automatically go through a holding or recharging cycle which includes states S-0, S-5, S-6, and S-4.

In state S-5, the HD and $C_1$ terminals are first pulsed, thereby shifting the information bits from the upper section down to the inverters 104. Clock terminal $C_2$ is then pulsed and the information bits are again stored with a full charge back in the same upper sections of the memory cells No. 1 to No. N. State S-6 is provided to shift the marker bit one cell to the left in the same manner as described for state S-2. Shifting of the marker bit one cell back to the right is accomplished by state S-4. Of course, during this left and right shifting of the marker bit, the MOS-devices are recharged.

If the marker bit was contained in the last memory cell No. N, i.e., the FIFO is full, and a hold cycle is initiated, the marker bit will be shifted left out of memory cell No. N by state S-6. Since there are no memory cells after cell No. N in which the marker bit may be stored when shifted left, then provision must be made to insert a "1" back into the marker bit section of memory cell No. N, when the shift right cycle is performed by state S-4. As described above, when the shift right cycle (state S-4) is normally performed (FIFO not full), the output of NAND-gate 122 is a "1." This "1" is inverted by inverter 104 in memory cell No. N when $C_1$ is clocked and the resulting "0" is stored by sample-and-hold transistor 100 in memory cell No. N when $C_3$ is clocked. However, when the FIFO is full and there has not been a read cycle, which is initiated by a pulse on terminal SH, then the output of NAND-gate 122 is a "0" because both inputs, F and RT are a "1." The input F is a "1" because flip-flop 120, which has been set by the full signal, will not be reset by an SH signal. Of course the RT input will also be a "1" for the shift right cycle, state S-4.

Provision may also be made for a combined write-and-read cycle. If two requests, one write and one read, are made within a short predetermined time, there will be no necessity to shift the marker bit since the net change in stored information is zero. Therefore, state S-7, which is similar to state S-1, and state S-8, which is similar to state S-3, are provided to first write a bit of information in the memory and then read one bit of information respectively. No shifting of the marker bit is provided in this cycle.

The MOS-transistors shown in the device of FIG. 1 may all be fabricated on a single chip. An entire memory array would be made up of a plurality of such chips connected in series. As one chip is filled, the marker bit which is shifted from memory cell No. N-1 to memory cell No. N is simultaneously shifted to the marker bit storage cell 30 on the succeeding chip. The following input data is then stored on the succeeding chip in the same manner.

Functionally, the FIFO may be described as being composed of a bidirectional shift register, a unidirectional shift register and some control logic. The bidirectional shift register consists mainly of the marker bit portions of the memory cells, i.e., transistor 100 and inverter 101. Only one bit is inserted in the bidirectional shift register and this bit is shifted one stage or cell at a time either left or right depending on the operation performed.

The information bit portions of the memory cells i.e., transistor 106 and inverter 107 is simply a unidirectional shift register since the information bits therein are shifted only to the right i.e., during a read cycle. The inverters 104 are actually common to both registers and together with transistors 105, 108, 109, 110 perform three main functions. First, when shifting the bidirectional shift register either left or right, these devices actually steer or control the direction of shift. For example, when shifting the marker bit to the right from memory cell No. 2 to No. 1, the marker bit is shifted from the output of inverter 101 via sample-and-hold transistor 109 of memory cell No. 2, inverter 104 to sample-and-hold transistor 100 of memory cell No. 1. Also, for similar reasons the inverter 104 becomes a part of the unidirectional shift register when information is being read, i.e., when information is being shifted right. Lastly, the inverter 104 is used as a logic control element interconnecting corresponding stages of both shift registers and the data input, so as to steer the data into the proper location.

Obviously many modifications and variations of the present invention are possible in the light of the above teachings. It is therefore to be understood, that within the scope of the appended claims, the invention may be practiced otherwise then as specifically described.

What is claimed is:

1. A first-in, first-out memory comprising; a data input means for writing data into said memory; a plurality of memory cells connected in series; each said memory cell having a data bit storage means and a marker bit storage means; each said storage means including a binary sample-and-hold means and a clocked inverter means; steering means connected to each said marker bit storage means and controlled by the marker bit storage means containing said marker bit for steering data from said data input means into one of said memory cells; and shifting means connected to each of said marker bit storage means for shifting said marker bit in increments of one said memory cell for each data bit written.

2. A first-in, first-out memory including a series of memory cells connected in series; each said memory cell having a marker bit storage means, a data bit storage means, and a control means; a data input means connected to each said memory cell; each said control means including means connected to the marker bit storage means in the associated one of said memory cells and energized by a marker bit therein for steering data applied to said data input means into said data bit storage means of said cell containing said marker bit; and means connected to each said control means for shifting the marker bit to the succeeding memory cell of said series for each said data bit stored.

3. The memory according to claim 2 including a data bit output means connected to the first memory cell in said series; and means connected to said control means for shifting the marker bit and the data bits in each said memory cell to the preceding cell of said series for each bit read at said data output means.

4. The memory according to claim 3 and wherein said data bit storage means and said marker bit storage means each includes a sample-and-hold MOS-transistor; each said transistor having an input terminal, an output terminal, and a clock terminal; and each said input terminal being connected to each said control means whereby said data bits and said marker bits are shifted from each said control means and stored in each said storage means upon the clocking of said clock terminal.

5. The memory according to claim 4 including a marker bit storage cell means connected to the first said memory cell in said series for storing said marker bit when said memory is empty.

6. In a first-in, first-out memory for storing data bits successively in a series of memory cells connected in tandem and for shifting all said data bits successively out one end of said memory, each said memory cell comprising; a data bit storage means, a marker bit storage means, and a control means; said data bit storage means and said marker bit storage means each including a sample-and-hold transistor means and a clocked inverter transistor means; the output of said sample-and-hold transistor means being connected to the input of said clocked inverter transistor means; said control means including a clocked inverter transistor means and first, second, third and fourth sample-and-hold transistor means; the output of said inverter means in said marker bit storage means being connected to the input of said first and second sample-and-hold transistor means; the output of said inverter means in said data bit storage means being connected to the input of said third and fourth sample-and-hold transistor means; the input to said clocked inverter transistor means of said control means being connected to the output of said fourth sample-and-hold transistor means, to the outputs of the first and third sample-and-hold transistor means in the succeeding memory cell, and to the output of the second sample-and-hold transistor means of the preceding memory cell; and the output of said clocked inverter transistor means of said storage means connected to the inputs of said sample-and-hold transistor means in said marker bit storage means and said data bit storage means.

7. The memory according to claim 6 and wherein each said transistor means are MOS transistors.

* * * * *